United States Patent
Braun et al.

(10) Patent No.: US 10,031,996 B2
(45) Date of Patent: Jul. 24, 2018

(54) TIMING BASED NET CONSTRAINTS TAGGING WITH ZERO WIRE LOAD VALIDATION

(71) Applicant: INTERNATIONAL BUSINESS MACHINES CORPORATION, Armonk, NY (US)

(72) Inventors: Florian Braun, Stuttgart (DE); Lukas Daellenbach, Altdorf (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/378,383

(22) Filed: Dec. 14, 2016

(65) Prior Publication Data
US 2018/0165405 A1    Jun. 14, 2018

(51) Int. Cl.
G06F 9/455   (2018.01)
G06F 17/50   (2006.01)

(52) U.S. Cl.
CPC ...... *G06F 17/5081* (2013.01); *G06F 2217/06* (2013.01)

(58) Field of Classification Search
USPC .............. 716/104, 106, 105, 108, 113, 114
See application file for complete search history.

(56) References Cited

U.S. PATENT DOCUMENTS

| 5,629,860 | A  | * | 5/1997 | Jones ................. G06F 17/5072 716/113 |
| 6,622,291 | B1 | * | 9/2003 | Ginetti ............... G06F 17/5045 716/108 |
| 8,370,786 | B1 |   | 2/2013 | Burstein |
| 8,543,964 | B2 |   | 9/2013 | Ge et al. |
| 8,789,004 | B2 |   | 7/2014 | Chen et al. |
| 9,298,872 | B2 |   | 3/2016 | Nam et al. |

(Continued)

OTHER PUBLICATIONS

Bang et al., "Delay Uncertainty and Signal Criticality Driven Routing Channel Optimization for Advanced DRAM Products", 21st Asia & South Pacific Design Automation Conference (ASP-DAC) (2016) (pp. 697-704).

(Continued)

*Primary Examiner* — Brian Ngo
(74) *Attorney, Agent, or Firm* — William A. Kinnaman, Esq.; Kevin P. Radigan, Esq.; Heslin Rothenberg Farley & Mesiti P.C.

(57) ABSTRACT

A method is provided for facilitating an integrated circuit design layout. The method includes receiving a netlist including a plurality of subnets. For each subnet, the method also includes obtaining a Steiner net length value and related net delays in a signal path for a metal wiring layer using timings of all involved circuits of the subnet, and determining whether the net delay is smaller than a predefined value. On a negative outcome of the determination, a wire delay is ascertained for the named metal wiring layer based on a maximum buffer distance retrieved from a cycle reach table, and determining whether the ascertained wire delay is below the related net delay. On a positive outcome of the second determination, a next increased metal wire width is selected and a metal wire based wire delay for the named metal wiring layer including a buffer is ascertained.

20 Claims, 8 Drawing Sheets

(56) References Cited

U.S. PATENT DOCUMENTS

| | | |
|---|---|---|
| 2002/0083398 A1* | 6/2002 | Takeyama ............ G06F 17/5045 |
| | | 716/102 |
| 2009/0254875 A1 | 10/2009 | Mehrotra et al. |
| 2012/0151193 A1 | 6/2012 | Daellenbach et al. |
| 2014/0089880 A1 | 3/2014 | Haller et al. |
| 2014/0223397 A1 | 8/2014 | Alpert et al. |
| 2014/0331196 A1 | 11/2014 | Helvey |

OTHER PUBLICATIONS

Lukas Daellenbach, "Optimizing Routing of a Signal Path in a Semiconductor Device", U.S. Appl. No. 15/372,848, filed Dec. 8, 2016 (38 pages).

Braun et al., "List of IBM Patents and/or Patent Applications Treated as Related", U.S. Appl. No. 15/378,383, filed Dec. 14, 2016, dated Jan. 5, 2017 (2 pages).

Moffitt et al.; "Wire Synthesizable Global Routing for Timing Closure", 16th Asia and South Pacific Design Automation Conference (ASP-DAC) (Jan. 25-28, 2011) (pp. 545-550).

Wei et al., "Catalyst: Planning Layer Directives for Effective Design Closure", Design, Automation, and Test in Europe Conference & Exhibition (Mar. 18-22, 2013) (6 Pages).

Dong et al., "Delay-Driven Layer Assignment in Global Routing Under Multi-tier Interconnect Structure", Proceedings of the 2013 ACM International Symposium on Physical Design (ISPD '13), (Mar. 24-27, 2013) (pp. 101-107).

\* cited by examiner

| 202 | synthesis run or VHDL import for a hyrarchical design |

| 204 | placement of the hyrarchical design netlist or timing driven placement |

| 206 | net tagging with width and uselayers |

| 208 | run a global route on the netlist |

| 210 | implement buffers at the global routes |

| 212 | run detailed route on all subnets |

| 214 | timing run on the complete netlist |

410

| metal layer | width | Δt/mm | buffer distance |
|---|---|---|---|
| 1xM1/M2 | 1x | 1x | $\Delta l_{buff, M1}$ |
| 1.5xM1/M2 | 1.5*M1/M2 | 0,66 | $\Delta L_{buff, M1}$ *1.5 |
| 1*M3/M4 | 2xM1/M2 | 0.5x | $\Delta L_{buff, M1}$ *2 |
| 1.5*M3/M4 | 3xM1/M2 | 0.33x | $\Delta L_{buff, M1}$ *3 |
| 1*M5/M6 | 4xM1/M2 | 0.25x | $\Delta L_{buff, M1}$ *4 |
| 1.5*M5/M6 | 6xM1/M2 | 0.166x | $\Delta L_{buff, M1}$ *6 |
| 1*M7/M8 | 8xM1/M2 | 0.125x | $\Delta L_{buff, M1}$ *8 |
| 1.5*M7/M8 | 12xM1/M2 | 0.08x | $\Delta L_{buff, M1}$ *12 |

FIG. 5

TIMING BASED NET CONSTRAINTS TAGGING WITH ZERO WIRE LOAD VALIDATION

BACKGROUND

The invention relates generally to a method for multi-layer integrated circuit design layout, and more specifically, to a method in a data processing system for timing based net constraints tagging within a multi-layer integrated circuit design layout. The invention relates further to a system for timing based net constraints tagging within a multi-layer integrated circuit design layout, and a computer program product.

Today's electronic components are in many cases integrated circuits of semiconductor devices. Hundreds, or millions, of such semiconductor devices may be integrated in one single chip. In order to design the circuits and the layout of individual functional components or sub-groups, designers use a variety of software based tools. The tools may be designed to use the electronic components or groups of components as functional blocks with input pins and output pins and help the designers to place the components or groups of components on, respectively, the chip surface. The functional blocks with all its characteristics—e.g., individual delays—are typically provided by related libraries. The individual functional blocks may be interconnected with wires. Such a mash of functional blocks and their wiring may be called a net. Due to the length of the wires, the travel time of signals, expected heat dissipation, and circuit delay times, a highly sophisticated layout process has to be applied in order to make a chip finally work as a whole including all functional blocks and sub-blocks.

Due to the high number of functional blocks and the nearly limitless options to place the functional blocks on, respectively, the chip, wiring becomes a critical constraint. The wiring itself allows for multiple design choices such as the kind of metal chosen or width or height of the wire. It may also be noted that different wiring layers (isolated from each other) may be present in real chips. Additionally, the minimum and maximum width and height may be layer-dependent.

Thus, a large number of dependencies have to be reflected in the design of more and more complex chips. Detecting physical limitations not as early as possible in a design process may be time consuming and not cost effective.

SUMMARY

According to one or more aspects of the present invention, a method in a data processing system for timing based net constraints tagging within a multi-layer integrated circuit design layout may be provided. The method may include receiving a hierarchical netlist characterizing the multi-layer integrated circuit design layout. The netlist includes a plurality of subnets. Each subnet includes a plurality of partial circuits.

For each subnet the following may be performed: obtaining a Steiner net length value between the subnets and partial circuits and related net delays of all subnets and partial circuits in a signal path defined by the hierarchical netlist for a named metal wiring layer using timing characteristics of each source circuits and related sink circuits of the subnet; determining, in a first determination, whether the net delay is not larger—i.e., smaller—than a predefined delay value. On a negative outcome of the first determination, a metal wire based wire delay for the named metal wiring layer may be ascertained based on a maximum buffer distance retrieved from a cycle reach table. Additionally, it may be determined, in a second determination, whether the calculated metal wire based wire delays are below the related net delays.

On a positive outcome of the second determination, a next increased width of the metal wire retrieved from the cycle reach table may be selected and the method may continue with the ascertaining of a metal wire based wire delay for the named metal wiring layer including a buffer, i.e., in a loop process.

Systems and computer program products relating to one or more aspects are also described and claimed herein.

Additional features and advantages are realized through the techniques described herein. Other embodiments and aspects are also described in detail herein, and may be considered part of the claimed aspects.

BRIEF DESCRIPTION OF THE DRAWINGS

It should be noted that embodiments of the invention are described with reference to different subject-matters. In particular, some embodiments are described with reference to method type claims whereas other embodiments are described with reference to system type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the system type claims, is considered as to be disclosed within this document.

The aspects defined above and further aspects of the present invention are apparent from the examples of embodiments described hereinafter and are explained with reference to the examples of embodiments, but to which the invention is not limited.

Figure 1:
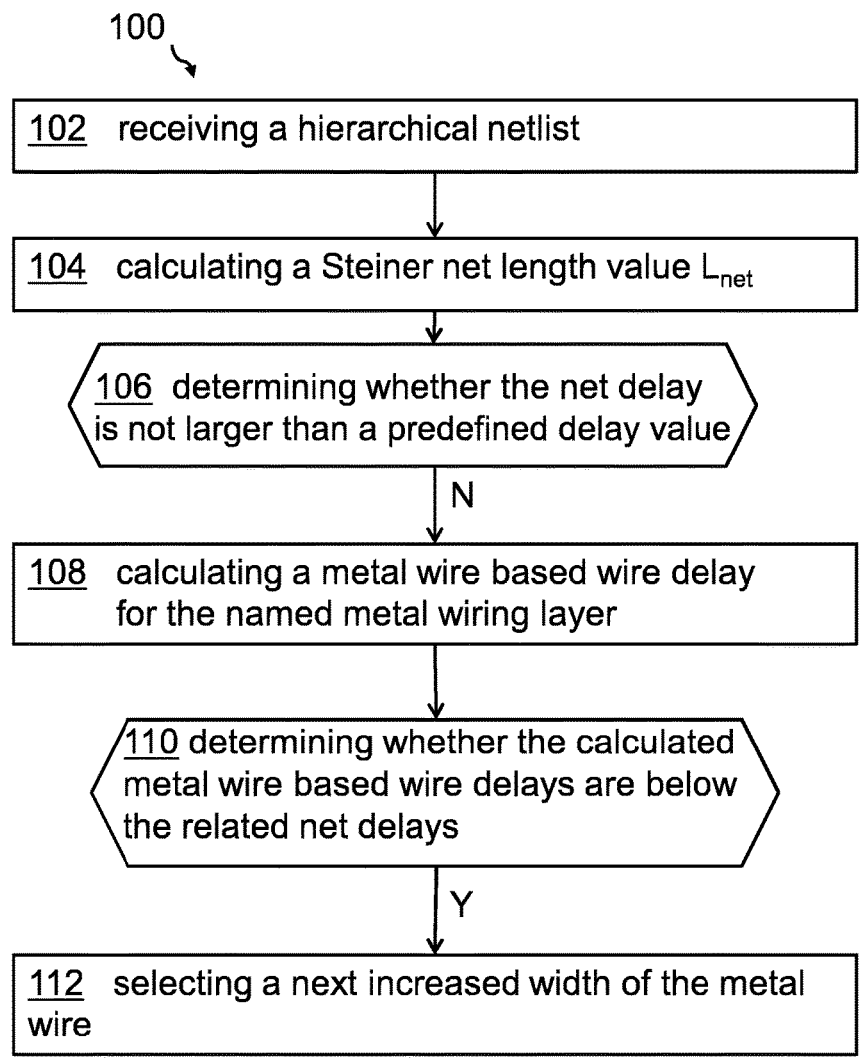
Figure 2:
Figure 2:
Figure 2:
Figure 2:
Figure 2:
Figure 2:
Figure 2:
Figure 3:
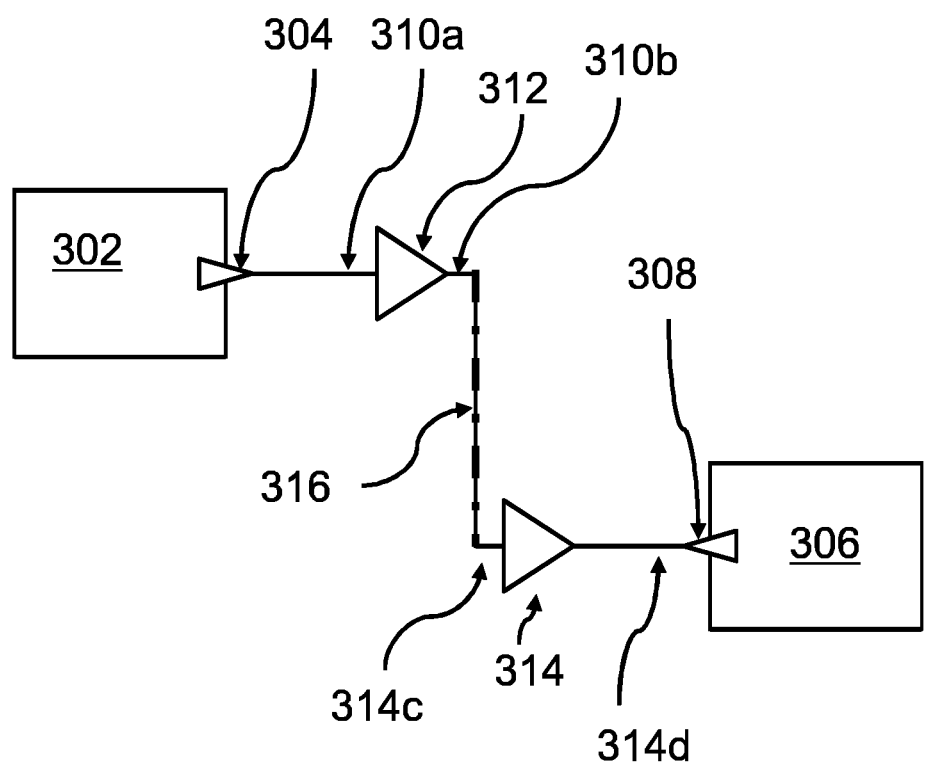
Figure 4:
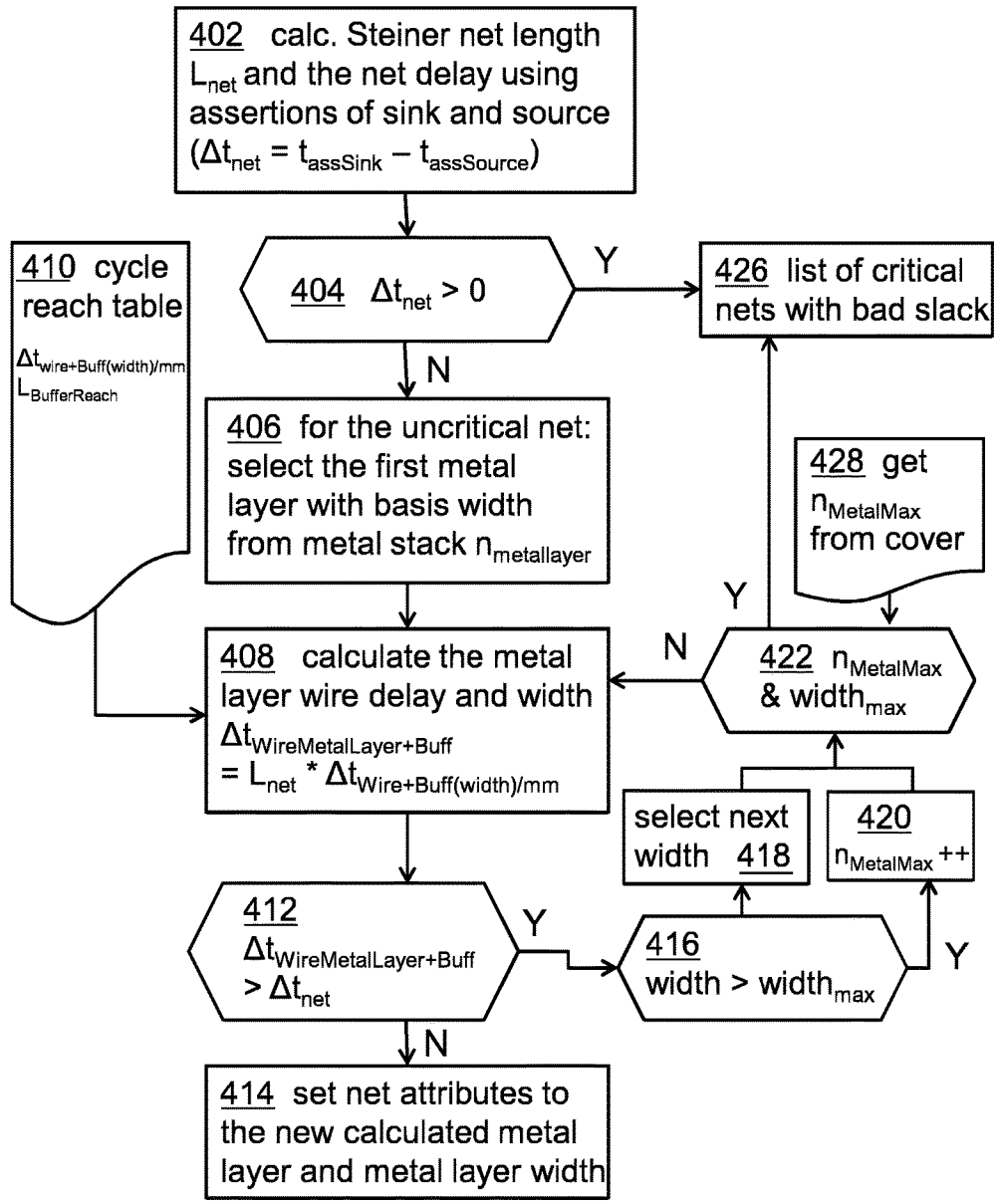
Figure 6:
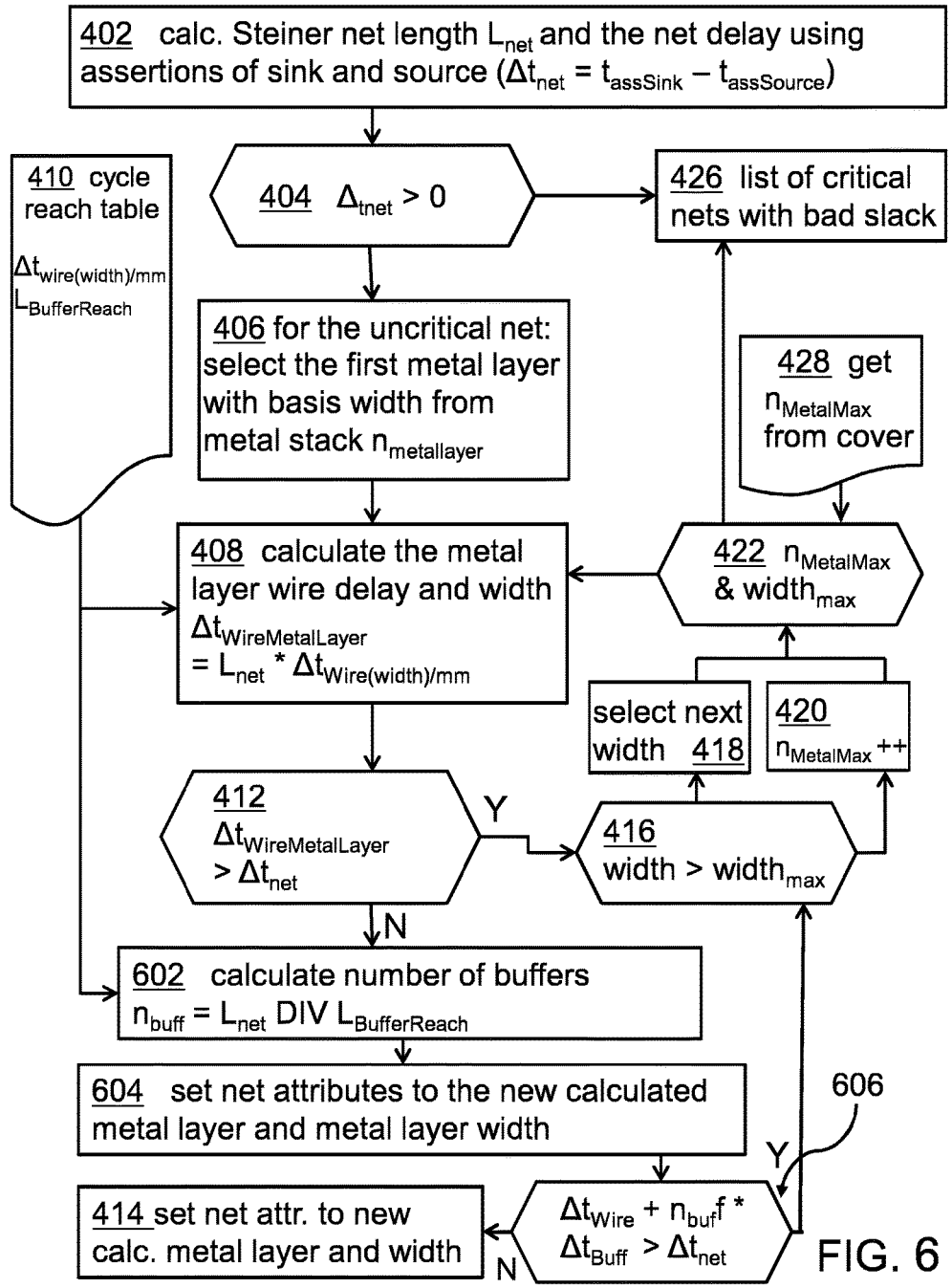
Figure 7:
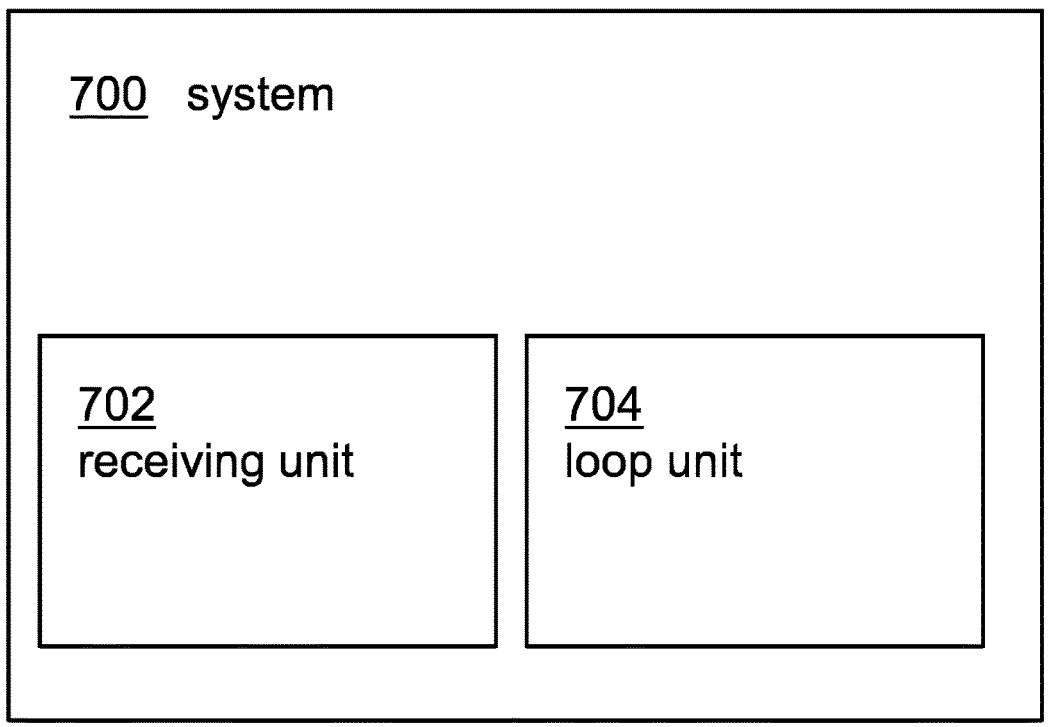
Figure 8:
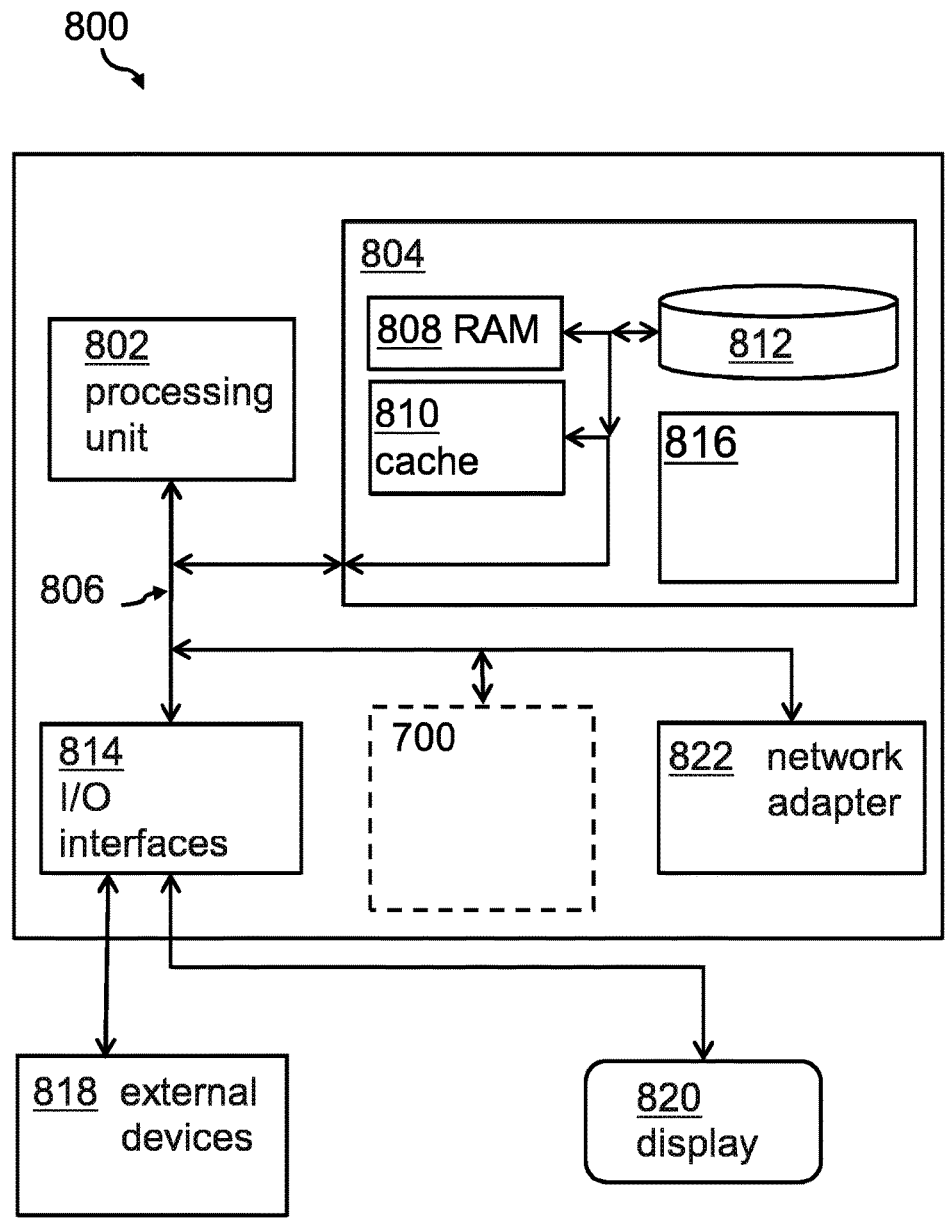

Embodiments of the invention are described below, by way of example only, with reference to the drawings, in which:

FIG. 1 shows a block diagram of an embodiment of a method for timing based net constraints tagging within a multi-layer integrated circuit design layout, in accordance with one or more aspects of the present invention;

FIG. 2 shows a block diagram of a general approach 200 for a chip design process, in accordance with one or more aspects of the present invention;

FIG. 3 shows the concept of the Steiner length;

FIG. 4 shows a more detailed block diagram of an embodiment of a method, in accordance with one or more aspects of the present invention;

FIG. 5 shows an embodiment of a cycle reach table, in accordance with one or more aspects of the present invention;

FIG. 6 shows another more detailed block diagram of an embodiment of a method 100 with a calculation of the number of buffers, in accordance with one or more aspects of the present invention;

FIG. 7 shows an embodiment of a system for timing based net constraints tagging within a multi-layer integrated circuit design layout, in accordance with one or more aspects of the present invention; and FIG. 8 shows a computing system which implement one or more aspects of a method, in accordance with one or more aspects of the present invention.

DETAILED DESCRIPTION

In the context of this description, the following conventions, terms and/or expressions may be used:

The term 'multi-layer integrated circuit design layout' may denote the process of designing an integrated semiconductor chip including a plurality of devices. The layout may be denoted as multilayer if a plurality of wiring layers—each isolated from the others—may be used.

The term 'hierarchical netlist' may denote a netlist of components. Each component may be an individual device or a combination of individual devices. Such a combination of individual devices may be treated as a subnet such that details of the subnet may not be visible by a higher layer of the hierarchical netlist. Such a subnet may be treated as a black box with input pins and output pins. Most characterizing details within the subnet may not matter for the inventive aspects disclosed herein.

The term 'partial circuits' may denote a functional block like a single semiconductor device or a small group of interconnected semiconductor devices. However, one characteristic of such a partial circuit may be that it may not function without other partial circuits. Typically, all partial circuits, components, and functional blocks of a normal or a hierarchical netlist are available from libraries.

The term 'Steiner net length' may denote a physical length value between a signal source and a signal sink. The name 'Steiner net length' is derived from the known minimum Steiner tree problem, named after Jakob Steiner, which is a problem in combinatorial optimization, which may be formulated in a number of settings, with the common part being that it is required to find the shortest interconnect for a given set of objects. In the context of this document, the Steiner net length may be defined as Lnet=|xsink−xsource|+|ysink−ysource|, wherein x and y are physical coordinates of a component in a netlist on an integrated—more or less flat or planar—semiconductor chip. The signal source and the signal sink may be connected by a wire so that Lnet may simply express the length of the wire between the two involved circuits, namely a signal source and a sink signal. It may also be assumed that the wiring is only using paths that are parallel to either an x-axis or y-axis of an assumed coordinate system which plain lies parallel to the planar surface of the related semiconductor chip.

Consequently, the term 'source circuits' may denote a semiconductor device including a signal-out pin. This signal-out pin may be a source of an electrical signal, i.e., a source. Accordingly, the term 'sink circuits' may denote—on the other side and in contrast of the source circuit—a semiconductor device including a signal-in pin. This signal-in pin may be an input port of an electrical signal, i.e., a sink.

The term 'maximum buffer distance' may denote a length of an on-chip wiring until it may be required to integrate a buffer into the wire line in order to keep the signal level above a minimum signal value. The maximum buffer distance may be dependent on the wire metal used and related wire width.

The term 'slack' may denote a certain delay of a signal on a wire or including a device or subnet.

The term 'slew' may denote the deformation of a signal in form of 'smeared' signal edges. i.e., the degree the signal is not behaving like an ideal rectangular signal form with vertical edges.

The term 'metal material' may denote the kind of metal chosen for a specific wiring. It may include aluminum, gold, tungsten, or similar metal types known by a person skilled in the art of chip design.

The disclosed method in a data processing system for timing based net constraints tagging within a multi-layer integrated circuit design layout may offer multiple advantages and technical effects.

By using one or more aspects, wrong design choices may be detected early in the design process. The method may be used to choose the right metal layer for specific interconnections of components in the chip, as well as wired width and space for a complete net and not only for partial segments. Therefore, the method may start with the lowest given metal layer. When the method gets the correct metal layer, width and space (wire delay is smaller than the net delay) it may ascertain the number of buffers, so that the number of buffers based on the best metal layer, wire width and wire space is obtained.

The detection of potentially not producible chip designs may increase the productivity in the design process of multi-layer semiconductor chip design.

According to one embodiment of the method, the hierarchical netlist may define a timing based on a slack, i.e., a delay, a slew, i.e., not exact edges of signals, a driver strength of all of the source circuits and a pin capacitance of all of the subnets and partial circuits within the hierarchical netlist. Hence, all characteristic parameters may be included in the timing of the hierarchical netlist.

According to another embodiment, the method includes, in case of a negative outcome of the second determination, selecting timing delays of the named metal wiring layer and the calculated metal wire width from the cycle reach table. Thus, the cycle reach table is an advantageous element of the method. It may provide values of alternative widths of the wiring and related, expected timing delays. Other characteristic parameter values may also be stored in the cycle reach table.

According to one advantageous embodiment of the method, the selecting a next increased width of the metal wire may also include increasing a number of the named metal wire layer if a maximum width value—in particular, of a wire of a specific named layer—has been exceeded. Thus, there may be used a hierarchical numbering scheme for the different wiring layers. The further away the wiring layer is from the natural surface of the underlying semiconductor bulk material, the higher the number of the wire may be. Typically, wiring layers, higher above the bulk semiconductor layer, may allow for wires having a bigger width.

According to a further, advantageous embodiment of the method, the selecting a next increased width of the metal wire may also include highlighting the related subnet—which may have a bad slack and which may be the root cause for a required change in the logic layout or changes in timing assertion if the number of the named metal wire layer exceeds a predefined maximum layer number. The maximum layer number may be defined by the so called 'cover', which is a list of design parameters of the limits and other details of designable logic chips also reflecting physical limits or other manufacturing constraints.

If a subnet is highlighted or an alert is set for such a subnet or it is output with or without a related comment to the chip designer, then this may be a hint that physical or production limits have been exceeded and the related semiconductor chip is not producible in a functional form. The combination of all interconnected devices would simply not work as wanted. In such a case, the design may be rejected for further processing.

According to an additional embodiment of the method, the ascertaining (e.g., calculating) the metal wire based wire delay for the named metal wiring layer including at least one buffer may include using a wire length and buffer delay table, e.g., the cycle reach table, including a predefined buffer delay, as well as a delay table defining wire delays based on a mix of used metal materials, a metal material width, and individual ratios of the mixed used metal materials. It may be noted that the buffer may be integrated into the wire in order to add an additional delay of a signal running through the related wire in order to synchronize the related signal with other signals within the semiconductor chip.

According to a further embodiment of the method, the cycle reach table may include at least one selected out of the group including a metal type, the width of the metal type, the delay and a maximum buffer distance. Thus, a required information basis of performing the here newly proposed concept is summarized in one table, easily accessible by the design layout toolset.

In the following, a detailed description of the figures is given. All instructions in the figures are schematic. Firstly, a block diagram of an embodiment of a method in a data processing system for timing based net constraints tagging within a multi-layer integrated circuit design layout is given. Afterwards, further embodiments as well as embodiments of the related system are described.

FIG. 1 shows a block diagram of an embodiment of a method 100 in a data processing system for timing based net constraints tagging within a multi-layer integrated circuit design layout. The method includes receiving, 102, a hierarchical netlist characterizing the multi-layer integrated circuit design layout. The netlist includes typically a plurality of subnets. Each subnet, which is typically treated as a 'black box', includes a plurality of partial circuits, which may be individual semiconductor components or a group of interconnected active or passive devices. For each subnet the following is performed: calculating, 104, a Steiner net length value Lnet, which does here not reflect the wire delay value, between the subnets and partial circuits and related net delays of all subnets and partial circuits in a signal path defined by the hierarchical netlist for a named metal wiring layer. Here, it may by assumed that the calculation is performed with zero wire load, i.e., a timing calculation without wire induced delays. The named wire starts with the lowest wiring layer, typically named the '1 layer'. For this timing characteristics, i.e., assertions are used of each source circuits and related sink circuits of the subnet.

Next, the method includes determining, 106—in a first determination—whether the net delay is not larger, i.e., smaller, than a predefined delay value. For instance, a test may be performed determining that the net delay is larger than 0 ps (pico second). If that is not the case—i.e., on a positive outcome of the determination—the chip may not be producible in a functional manner; a redesign would be required.

On a negative outcome of the first determination—meaning that in the 'N' branch of the determination, the chip would be producible—a metal wire based wire delay for the named metal wiring layer is calculated, 108, based on a maximum buffer distance retrieved from a cycle reach table, i.e., wireMetalLayer+Buffer=Lnet*twire+Buffre(width)/mm). Then, it is determined, 110, in a second determination, whether the calculated metal wire based wire delays are below the related net delays. On a positive outcome of the second determination, the method includes selecting, 112, a next increased width of the metal wire retrieved from the cycle reach table and continues with the step of calculating a metal wire based wire delay for the named metal wiring layer including a buffer.

It may be noted that the alternative branches of the determination are not shown in FIG. 1. They will be apparent from the subsequent figures.

FIG. 2 shows a block diagram of a general approach 200 for a chip design process. Given or imported, 202, is a netlist including components and devices like subnets, computing core, individual units with related timing characteristics. This is typically described in VHDL. The known VHDL (Very High speed Hardware Description Language) is a hardware description language used in electronic design automation to describe digital and mixed-signal systems such as field-programmable gate arrays and integrated circuits.

Next, a placement of the hierarchical design netlist or timing driven placement within the chip is performed, 204. The netlist represents a hierarchical design with macros, arrays, registers, or the given netlist represents a big macro after an automatic synthesis run, which results in an automatic placement of buffers in the unbuffered net.

The net itself represents a connection between these macro, arrays, registers and also connections between the blocks or I/O pins (input/output pins). The source is a pin at one of the above-mentioned buffers or an I/O pins of another active component. Also the sink(s) are pins in the block or I/O pins. The timing assertions describe the timing situation at these pins with given arrival times (slack), slew, driver strength and pin capacitance. The described process of the method 100 may advantageously be used after the placement of the hierarchical netlist or after the placement of the synthesis run, 206.

The remaining steps can be regarded as known process steps for a chip design: 208: running a global routing process on the netlist; 210: implement buffers at the global routes, 212: run a detail routing process on all nets, and 214: perform a timing run on all sub-netlists. Hence, very early in the design process—right after placement of the components—the process disclosed herein determines the metal layer resource for the given netlist. This may save time and money in the chip design process because potentially non-working design choices may not be implementable.

FIG. 3 shows the concept of the Steiner length. A pin 304 of an abstract circuit 302 may represent a signal source. A pin 308 of a second abstract circuit 306 may represent a sink for the signal. In-between the source and the sink, a wire is shown including portions 310a, 310b, 314c, 314d running in an assumed x-direction and portion 316—which may be made from a different metal M2 than the other portions (M1). The Steiner length value can be determined by:

$$L\text{net}=|x\text{sink}-x\text{source}|+|y\text{sink}-y\text{source}|,$$

assuming that there are no buffers in-between the source and the sink. The related delay without buffers may be calculated by:

$$\Delta t\text{Wire}=L\text{net}*\Delta t\text{Wire(width)/mm}.$$

For example, in case the buffers 312, 314 are connected in the way between the source and the sink, the delay can be calculated by:

$$\Delta t\text{Wire}=L\text{net}*\Delta t\text{Wire(width)/mm}+2*\Delta t\text{buff}.$$

This way, signals between a source and a sink may be adjusted in order to design a chip layout that is actually producible in a functional form.

FIG. 4 shows a more detailed block diagram of an embodiment of a method 100, in accordance with one or more aspects of the present invention. The process starts with a calculation 402 of a value of the Steiner net length Lnet and the net delay using assertions of sink and source according to Δtnet=tassSink−tassSource. Then, at 404, it is determined, whether Δtnet>0. If no, then the chip would not be producible. For the uncritical net, the first metal layer with basis width from metal stack nmetallayer is selected, 406, wherein n is an integer value representing the number of the wire layer. Next, the metal layer wire delay and width ΔtWireMetalLayer+Buff=Lnet*ΔtWire+Buff(width)/mm is calculated, 408. For this, use is made of the cycle reach table 410 which exemplary content is described—beside others—in FIG. 5.

As next process step, it is determined, 412, whether ΔtWireMetalLayer+Buff is smaller than Δtnet. If that is not the case—case 'N'—the net attributes are set, 414, to the new calculated metal layer and metal layer width. In case of a positive determination at step 412—case 'Y'—a new determination 416 is made to differentiate between the cases whether width>widthmax or not. If not, a next width is selected, 418, from the cycle reach table 410. In case of 'Y' (yes) the next higher metal layer is chosen (nMetalMax++), 420.

If in determination 422 it is confirmed that nMetalMax and widthmax are both exceeded—case 'Y'—a list of critical subnets with bad slack is produced, 426, and highlighted and output to the designer team for redesign. For this purpose, access is made to the value nMetalMax from 'cover', 428, or general design criteria lists. Actually, the same list of critical subnets with bad slack may be highlighted and output to the designer team if in determination step 404 whether Δtnet>0 a positive determination is made—case 'Y'.

FIG. 5 shows an embodiment of the cycle reach table 410. The column 'metal layer' shows examples of different metal types M1, M2, M3, M4, M5, M6, M7 and M8. The metal type may come in different widths, e.g., 1×, i.e., with factor 1, up to 12×, i.e., with a factor 12 if compared to the '1+M1/M2'-line of the cycle reach table. Corresponding, delay values Δt are also shown as a fraction factor of the first line. Furthermore, a maximum buffer distance is shown, indicating the maximum length of a specific wire type without the requirement for including a buffer in order to keep the signal strength above a required minimum value. The disadvantage of including buffers is that additional delays have to be reflected. The different wiring layers 'n' may be counted from top to bottom of the cycle reach table 410. For example, a real value for the first line of the buffer reach table may include 50 μm as the maximum buffer distance.

FIG. 6 shows another more detailed block diagram of an embodiment of the method 100 with a calculation of the number of buffers to get the timing right. Steps 402, 404, 406, 408, 412, 416, 418, 420, 422, 426, 428 as well as the cycle reach table 410 and the nMetalMax from the 'cover' 426 remain comparable to the ones in FIG. 4 and will not be described again. One difference is that here the Δt-values do not reflect the delays of the buffers. Instead the number of required buffers will be determined (compare 602).

Instead of step 414 (set net attributes to the new calculated metal layer and metal layer width') in case of 'N' of the determination 412, the process continues with a calculation 602 of the number of required buffers nbuff=Lnet DIV LBufferReach. Here, 'DIV' is a mathematical whole-number or integer division.

Based on that, net attributes are set, 604, to the new calculated metal layer and metal layer width. Then, it is determined, 606, whether ΔtWireMetalLayer+ nbuff*Δtbuff>Δtnet. In case of 'N', the process continues with the step known from FIG. 4, step 414 ('set net attributes to new calculated metal layer and width'). In case of 'N', the process continues with the known step 416 from FIG. 4.

According to another aspect of the present invention, a system for timing based net constraints tagging within a multi-layer integrated circuit design layout may be provided. The system may include a receiving unit adapted for receiving a hierarchical netlist characterizing the multi-layer integrated circuit design layout, wherein the netlist includes a plurality of subnets. Each subnet includes a plurality of partial circuits. The system also includes a loop unit adapted for performing for each subnet the following: calculating a Steiner net length value between the subnets and partial circuits and related net delays of all subnets and partial circuits in a signal path defined by the hierarchical netlist for a named metal wiring layer using timing characteristics of each source circuit and related sink circuit of the subnet, and determining, in a first determination, whether the net delay is not larger than a predefined delay value. Furthermore, the loop unit is adapted to, on a negative outcome of the first determination, calculate a metal wire based wire delay for the named metal wiring layer based on a maximum buffer distance as part of a cycle reach table, and determine, in a second determination, whether the calculated metal wire based wire delays are below the related net delays.

On a positive outcome of the second determination, the system selects a next increased width of the metal wire retrieved from the cycle reach table and continues with the calculating of a metal wire based wire delay for the named metal wiring layer including a buffer.

Furthermore, embodiments may take the form of a related computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

FIG. 7 shows a system 700 for timing based net constraints tagging within a multi-layer integrated circuit design layout. The system 700 includes a receiving unit 702 adapted for receiving a hierarchical netlist characterizing the multi-layer integrated circuit design layout. The netlist includes a plurality of subnets and each subnet includes a plurality of partial circuits. Furthermore, the system includes a loop unit 704 adapted for performing for each subnet the following: calculating a Steiner net length value between the subnets and partial circuits and a related net delays of all subnets and partial circuits in a signal path defined by the hierarchical netlist for a named metal wiring layer using timing characteristics of each source circuits and related sink circuits of the subnet, and determining, in a first determination, whether the net delay is not larger than a predefined delay value. On a negative outcome of the first determination, a metal wire based wire delay is calculated for the named metal wiring layer based on a maximum buffer distance as part of a cycle reach table. Then, in a second determination, it is determined whether the calculated metal wire based wire delays are below the related net delays. On a positive outcome of the second determination, a next increased width of the metal wire is selected out of the cycle reach table and continues with the calculating of a metal wire based wire delay for the named metal wiring layer including a buffer.

Embodiments of the invention may be implemented together with virtually any type of computer, regardless of the platform being suitable for storing and/or executing program code. FIG. 8 shows, as an example, a computing system 800 suitable for executing program code related to the method disclosed.

The computing system 800 is only one example of a suitable computer system and is not intended to suggest any limitation as to the scope of use or functionality of embodiments of the invention described herein. Regardless, computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types. Computer system/server 800 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couples various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

Program/utility 814, having a set (at least one) of program modules 816, may be stored in memory 804 by way of example, and not limitation, as well as an operating system, one or more application programs, other program modules, and program data. Each of the operating system, one or more application programs, other program modules, and program data or some combination thereof, may include an implementation of a networking environment. Program modules 816 generally carry out the functions and/or methodologies of embodiments of the invention as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of computer system/server 800 via bus 806. It should be understood that although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the system 700 for timing based net constraints tagging within a multi-layer integrated circuit design layout may also be attached to the bus system 806.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "includes" and/or "including,"

when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A method in a data processing system for timing based net constraints tagging within a multi-layer integrated circuit design layout, the method comprising:
   receiving a hierarchical netlist characterizing the multi-layer integrated circuit design layout, wherein the netlist includes a plurality of subnets, each subnet comprising a plurality of partial circuits; and
   for each subnet, processing the subnet to facilitate laying out wiring for the multi-layer integrated circuit design, the processing facilitating providing a complete netlist with wiring layout, and including the following:
      ascertaining a Steiner net length value between the subnets and partial circuits and related net delays of all subnets and partial circuits in a signal path defined by the hierarchical netlist for a named metal wiring layer using timing characteristics of each source circuit and related sink circuit of the subnet;
      determining, in a first determination, whether the net delay is not larger than a predefined delay value;
      on a negative outcome of the first determination, ascertaining a metal wire based wire delay for the named metal wiring layer based on a maximum buffer distance retrieved from a cycle reach table;
      determining, in a second determination, whether the ascertained metal wire based wire delay is below the related net delay;
      on a positive outcome of the second determination, selecting a next increased width of the metal wire out of the cycle reach table;
      continuing with the ascertaining of a metal wire based wire delay for the named metal wiring layer including a buffer; and
      initiating fabrication of the multi-layer integrated circuit using the complete netlist with wiring layout.

2. The method according to claim 1, wherein the hierarchical netlist defines a timing based on a slack, a slew, a driver strength of all of the source circuits and a pin capacitance of all of the subnets and partial circuits within the hierarchical netlist.

3. The method according to claim 1, further comprising, based on a negative outcome of the second determination, selecting timing delays of the named metal wiring layer and the metal wire width from the cycle reach table.

4. The method according to claim 1, wherein the selecting a next increased width of the metal wire also comprises increasing a number of the named metal wire layer if a maximum width value has been exceeded.

5. The method according to claim 1, wherein the selecting a next increased width of the metal wire also comprises highlighting the related subnet based on the number of the named metal wire layer exceeding a predefined maximum layer number.

6. The method according to claim 1, wherein the ascertaining a metal wire based wire delay for the named metal wiring layer including at least one buffer comprises:
   using a cycle and buffer delay table comprising a predefined buffer delay value as well as a delay table defining wire delays based on a mix of used metal materials, a metal material width, and individual ratios of the mixed used metal materials.

7. The method according to claim 1, wherein the cycle read table includes at least one selected out of the group comprising a metal type, the width of the metal type, the delay and a the maximum buffer distance.

8. A system for timing based net constraints tagging within a multi-layer integrated circuit design layout, the system comprising:
   a memory; and
   a processor communicatively coupled to the memory, wherein the system performs a method comprising:
      receiving a hierarchical netlist characterizing the multi-layer integrated circuit design layout, wherein the netlist includes a plurality of subnets, each subnet comprising a plurality of partial circuits; and
      for each subnet, processing the subnet to facilitate laying out wiring for the multi-layer integrated circuit design, the processing facilitating providing a complete netlist with wiring layout, and including the following:
         ascertaining a Steiner net length value between the subnets and partial circuits and related net delays of all subnets and partial circuits in a signal path defined by the hierarchical netlist for a named metal wiring layer using timing characteristics of each source circuit and related sink circuit of the subnet;
         determining, in a first determination, whether the net delay is not larger than a predefined delay value;
         on a negative outcome of the first determination, ascertaining a metal wire based wire delay for the named metal wiring layer based on a maximum buffer distance retrieved from a cycle reach table;
         determining, in a second determination, whether the ascertained metal wire based wire delay is below the related net delay;
         on a positive outcome of the second determination, selecting a next increased width of the metal wire out of the cycle reach table;
         continuing with the ascertaining of a metal wire based wire delay for the named metal wiring layer including a buffer; and
         initiating fabrication of the multi-layer integrated circuit using the complete netlist with wiring layout.

9. The system according to claim 8, wherein the hierarchical netlist defines a timing based on a slack, a slew, a driver strength of all of the source circuits and a pin capacitance of all of the subnets and partial circuits within the hierarchical netlist.

10. The system according to claim 8, further comprising, based on a negative outcome of the second determination selecting timing delays of the named metal wiring layer and the metal wire width from the cycle reach table.

11. The system according to claim 8, wherein the selecting a next increased width of the metal wire also comprises increasing a number of the named metal wire layer if a maximum width value has been exceeded.

12. The method according to claim 8, wherein the selecting a next increased width of the metal wire also comprises highlighting the related subnet based on the number of the named metal wire layer exceeding a predefined maximum layer number.

13. The system according to claim 8, wherein the ascertaining a metal wire based wire delay for the named metal wiring layer including at least one buffer comprises:
    using a cycle and buffer delay table comprising a predefined buffer delay value as well as a delay table defining wire delays based on a mix of used metal materials, a metal material width, and individual ratios of the mixed used metal materials.

14. The system according to claim 8, wherein the cycle read table includes at least one selected out of the group comprising a metal type, the width of the metal type, the delay and a the maximum buffer distance.

15. A computer program product for timing based net constraints tagging within a multi-layer integrated circuit design layout, the computer program product comprising:
    a non-transitory computer readable storage medium having program instructions embodied therewith, the program instructions being executable by one or more computing systems to cause the one or more computing systems to:
        receive a hierarchical netlist characterizing the multi-layer integrated circuit design layout, wherein the netlist includes a plurality of subnets, each subnet comprising a plurality of partial circuits; and
        for each subnet, processing the subnet to facilitate laying out wiring for the multi-layer integrated circuit design, the processing facilitating providing a complete netlist with wiring layout, and including the following:
            ascertaining a Steiner net length value between the subnets and partial circuits and related net delays of all subnets and partial circuits in a signal path defined by the hierarchical netlist for a named metal wiring layer using timing characteristics of each source circuit and related sink circuit of the subnet;
            determining, in a first determination, whether the net delay is not larger than a predefined delay value;
            on a negative outcome of the first determination, ascertaining a metal wire based wire delay for the named metal wiring layer based on a maximum buffer distance retrieved from a cycle reach table;
            determining, in a second determination, whether the ascertained metal wire based wire delay is below the related net delay;
            on a positive outcome of the second determination, selecting a next increased width of the metal wire out of the cycle reach table;
            continuing with the ascertaining of a metal wire based wire delay for the named metal wiring layer including a buffer; and
        initiating fabrication of the multi-layer integrated circuit using the complete netlist with wiring layout.

16. The computer program product of claim 15, wherein the hierarchical netlist defines a timing based on a slack, a slew, a driver strength of all of the source circuits and a pin capacitance of all of the subnets and partial circuits within the hierarchical netlist.

17. The computer program product of claim 15, further comprising, based on a negative outcome of the second determination, selecting timing delays of the named metal wiring layer and the metal wire width from the cycle reach table.

18. The computer program product of claim 15, wherein the selecting a next increased width of the metal wire also comprises increasing a number of the named metal wire layer if a maximum width value has been exceeded.

19. The computer program product of claim 15, wherein the selecting a next increased width of the metal wire also comprises highlighting the related subnet based on the number of the named metal wire layer exceeding a predefined maximum layer number.

20. The computer program product of claim 15, wherein the ascertaining a metal wire based wire delay for the named metal wiring layer including at least one buffer comprises:
    using a cycle and buffer delay table comprising a predefined buffer delay value as well as a delay table defining wire delays based on a mix of used metal materials, a metal material width, and individual ratios of the mixed used metal materials.

* * * * *